Patented Oct. 23, 1934

1,977,635

UNITED STATES PATENT OFFICE 1,977,635

PROCESS FOR THE CATALYTIC HYDRATION OF OLEFINES

George Frederick Horsley, Norton-on-Tees, England, assignor to Imperial Chemical Industries Limited, a corporation of Great Britain No Drawing. Application September 26, 1933, Serial No. 691,077. In Great Britain September 26, 1932

6 Claims. (Cl. 260—156)

This invention relates to the hydration of ethylene and the dehydration of ethyl alcohol and in particular to an improved catalyst for these reactions.

It has already been proposed to prepare ethyl alcohol by heating ethylene and water under pressure, and in the presence of inorganic salts with an affinity for ethylene, e. g. mercuric chloride. It has also been proposed to prepare ethyl alcohol by treating ethylene with steam at an elevated temperature and under pressure in the presence of a dehydrating catalyst, e. g. thoria or phosphoric acid deposited on charcoal. Further, it has been proposed to prepare ethyl alcohol by hydration of ethylene in the presence of a catalyst comprising a phosphate of cadmium, beryllium, zinc, aluminium, tin or lead.

It is also well known to produce ethylene by dehydration of ethyl alcohol in the presence of catalysts such as sulphuric acid, aluminium, thoria, tungsten oxides and red phosphorus.

The principal object of the present invention is to provide new and improved catalysts for the hydration of ethylene to ethyl alcohol, but we have found it convenient to test the activity of catalysts for this reaction by determining their activity for the reverse reaction, namely the dehydration of ethyl alcohol to ethylene. It is apparent from theoretical considerations that for a reversible reaction the measure of the activities of catalysts for one reaction is proportional to the measure of their activities for the reverse reaction.

According to the present invention, in the catalytic hydration of ethylene or dehydration of ethyl alcohol a catalyst is employed consisting of, or comprising strontium phosphate. The catalyst may be prepared by any known or suitable method, and may, if desired, be employed in conjunction with known catalysts and/or in association with supports or carriers of an inert nature, e. g. pumice or asbestos.

The reactions are preferably carried out in the vapour phase, and at a temperature between 250°—350° C. The dehydration of ethyl alcohol may suitably be effected at atmospheric pressure but it is preferred to conduct the hydration of ethylene under an increased pressure say of 100 atmospheres. For this latter reaction and when working in the vapour phase it is preferred to employ a large excess of ethylene relative to steam, the gaseous reaction products being cooled to separate an aqueous solution of ethyl alcohol and the surplus ethylene being circulated.

The following examples illustrate the production of ethylene by dehydration of ethyl alcohol.

Example I

A catalyst was prepared by heating one molecular proportion of strontium carbonate with an aqueous solution containing two molecular proportions of phosphoric acid, the mixture being evaporated to dryness and the solid product dried at a temperature not exceeding 300° C. Ethyl alcohol was passed over the catalyst so prepared at a temperature of 250° C. and at atmospheric pressure, the time of contact of the gases with the catalyst being 36 seconds. The gaseous reaction products were cooled to condense water and unchanged alcohol, and substantially pure ethylene remained amounting to a yield of 95.5 per cent. of the alcohol employed.

Example II

A catalyst was prepared in the same manner as described in Example I. A mixture of ethylene and steam was passed over the catalyst under a total pressure of 100 atmospheres, the partial pressure of the steam being 30 atmospheres and the partial pressure of the ethylene 70 atmospheres. The catalyst was maintained at a temperature of 290° C. and the reaction gases were passed over the catalyst at a velocity of 6,000 volumes of gas (calculated at atmospheric pressure and 20° C.) per hour per unit volume of catalyst space. The product comprised 216 grams of ethyl alcohol per hour per litre of catalyst, and the yield of alcohol on the ethylene used up was 95 per cent with a conversion of ethylene per passage of 2.69 per cent.

I claim:—

1. A process for the catalytic hydration of olefines in which a catalyst is employed comprising essentially strontium phosphate.

2. A process for the catalytic hydration of olefines in the vapour phase in which a catalyst is employed comprising essentially strontium phosphate.

3. A process for the catalytic hydration of ethylene in which a catalyst is employed comprising essentially strontium phosphate.

4. A process for the catalytic hydration of ethylene which comprises the step of passing a mixture of ethylene and steam in contact with a catalyst comprising essentially strontium phosphate at a pressure greater than atmospheric and at a temperature between 250° and 350° C.

5. A process for the catalytic hydration of olefines which comprises the step of passing a mixture of olefine gas and steam in contact with a catalyst comprising essentially strontium phosphate at a pressure greater than atmospheric and at an elevated temperature.

6. A process as claimed in claim 5 in which the reaction mixture contains a large excess of olefines relative to steam, the gaseous products being cooled to separate an aqueous solution of the alcohol formed and the surplus olefines being re-circulated.

GEORGE FREDERICK HORSLEY.